Sept. 29, 1964 H. K. BAKER 3,150,542
VARIABLE SPEED TRANSMISSION
Filed Dec. 10, 1959 3 Sheets-Sheet 2
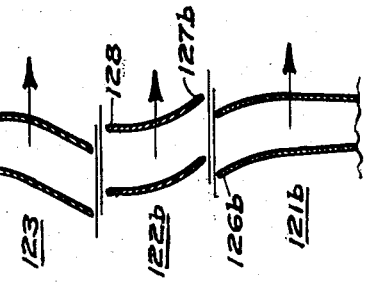
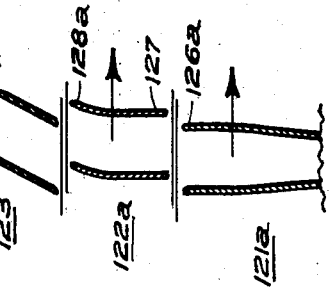
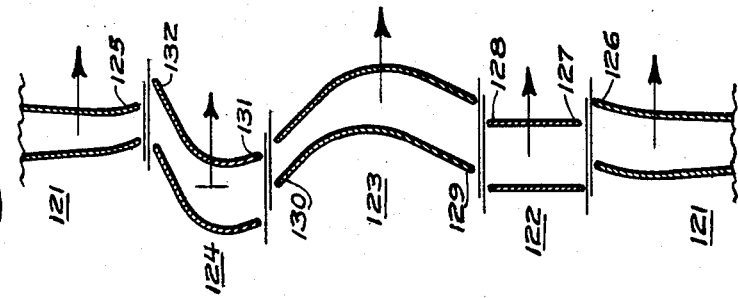
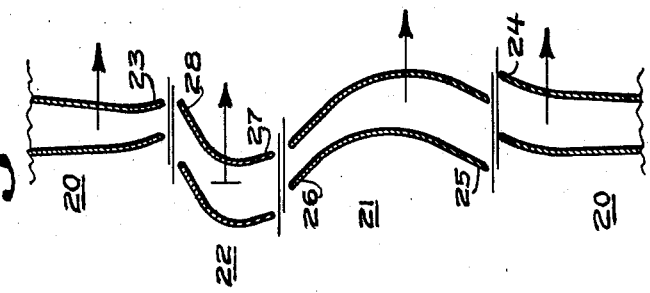
INVENTOR.
HERBERT K. BAKER
BY
FINN G. OLSEN
ATTORNEY

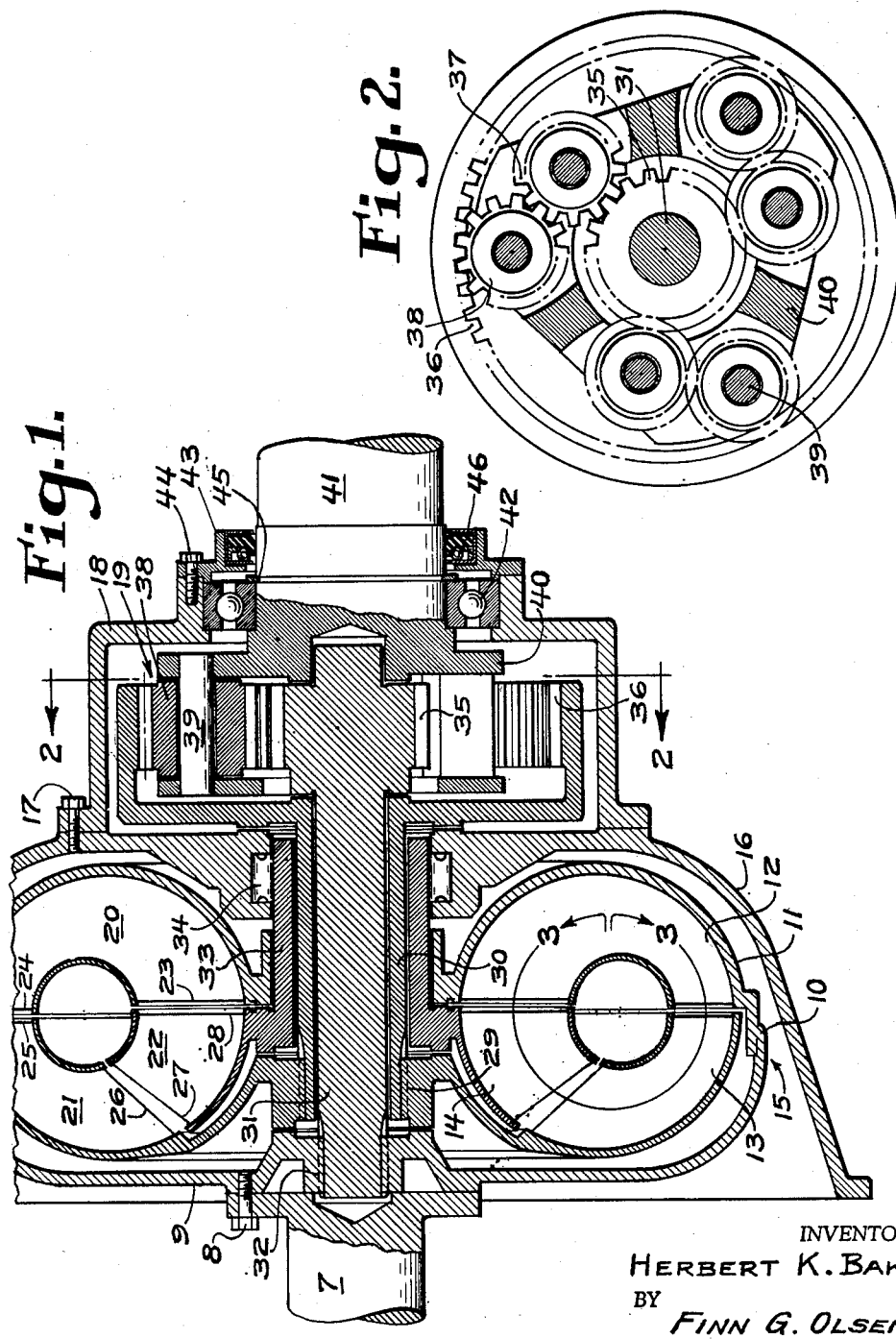

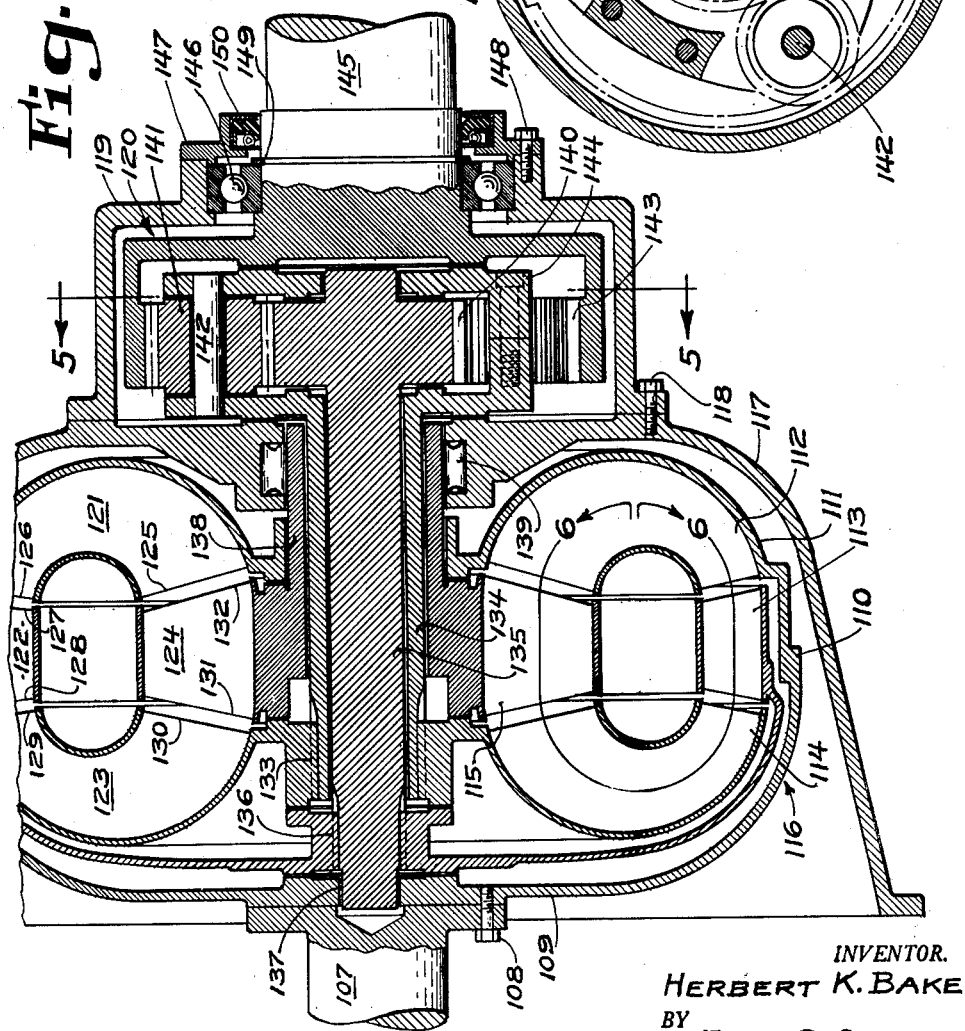

3,150,542
VARIABLE SPEED TRANSMISSION
Herbert K. Baker, 18100 Wisconsin, Detroit 21, Mich.
Filed Dec. 10, 1959, Ser. No. 858,640
32 Claims. (Cl. 74—688)

This invention relates to variable speed devices and in particular to those employing hydrodynamic means in coacting arrangement with planetary gearing systems of differential action character similar to the kind disclosed in my copending applications Serial No. 700,139 filed December 2, 1957, now abandoned, and Serial No. 720,148 filed March 10, 1958, now abandoned.

In common with the forms of devices disclosed by my aforesaid copending applications, the present invention discloses a turbine operatingly coupled to an element of the planetary gear set as the driving member thereof. This driving member transmits torque through planet pinions to two other elements of the gear set, one of which is arranged as the output member and the other of which is arranged as a rotating gearing reaction element. Under load stress, the rotating gearing reaction element tends to turn faster in the same rotating direction than the driving member which is arranged to turn at an intermediate speed and the output member which is arranged to turn at the lowest speed, comparatively, in an action of differential character. This rotating gearing reaction element is restrained from racing, in a form of my present invention, by being coupled to the impeller, and thus it contributes, in a regenerative power feedback action, a force to assist driving the impeller which force is added to the similar effort made by the prime mover.

The main object of the present invention is to define and proportion the elements of my arrangements to increase substantially the efficiency and extent of torque multiplication by my rotating gearing reaction concept.

Specifically, in my present invention the extent of force imposed on the rotating gearing reaction element governs to a like extent the amount of torque absorption for which the vanes of the rotors of the hydrodynamic portion of the device are to be fashioned or proportioned, and does not follow the conventional prior art practice of proportioning vanes of the rotors merely to absorb the input torque as exerted by the prime mover.

The proportion of the turbine torque feedback to the rotating gearing reaction element is governed by predetermined proportioning of the gear elements of the planetary gear set to exert correspondingly a specific ratioing action to my rotating gearing reaction element. This action actually divides the turbine torque into specific ratios of unequal proportions of which the rotating gearing reaction element transmits the minor portion and the output member the major portion.

In particular forms of my device the rotating gearing reaction element actually feeds back a proportion of the turbine torque to the impeller thereby assisting the power input member driven by the prime mover, and this proportion or ratio of feedback, in turn, is restored fluidly back to the turbine. Therefore, my rotating gearing reaction element may also be termed the "feedback member."

My coupling arrangement of the planetary gear set to elements of the hydrodynamic portion of the device is so effective as to project that efficiency of the torque output of the turbine or runner rotating at a higher speed, through to the gearing output rotating at a lower speed in an infinitely variable action which progressively increases the speed rate of diminishment of the output member faster than the turbine speed rate of diminishment so that the turbine is still rotating at a substantial speed ratio when the gearing output member attains stall conditions. This has the advantage of utilizing the turbine torque for driving at its higher efficiency curve range of operation; whereas, in conventional prior art practice the turbine stalls with stall of the output gearing member, thus, utilizing the turbine torque down to the lowest efficiency. As is well known in the art, the nearer stall of the turbine the greater the slip losses, and this undesirable condition of high slip losses is avoided by my invention.

With respect to the hydrodynamic portion of my device, the turbine or runner is driven by fluid impingement against its vanes by impeller vane motion. With a minor portion of the turbine torque transmitted by the feedback member back to the impeller, my impeller vanes are fashioned to encompass a volume of the motive fluid, correspondingly, to include that factor of the ratio of feed back torque from the turbine, at the fluid clutching phase of operation, plus the input member torque exerted thereto by the prime mover; and the turbine vanes are fashioned to encompass a like fluid volume, or nearly so. This vane proportioning factor, at the fluid clutching phase, restores that factor portion equivalent of the feedback torque back to the turbine by virtue of "increasing the weight of the mass acted upon by corresponding increase of force at the same velocity."

The gearing portion will multiply torque output of the hydrodynamic means of my device even though this latter portion may merely be arranged as a fluid coupling comprising a torque transferring arrangement of only a vaned impeller and a turbine without a vaned reaction member to amplify the fluid forces exerted on the turbine vanes.

A vaned reaction member increases the effectiveness of my device as to the extent and efficiency of torque multiplication output because of the fluid forces exerted on the turbine are amplified; and as the turbine force is transmitted to the driving member of the planetary gear set, this greater force is also compounded through my gearing concept. The vaned reaction member can be fixed to the housing in a stationary mounting arrangement or mounted on a one-way brake which permits the device to "fluid clutch" and is a desirable arrangement for vehicular operation.

Although the torque of my feedback member is at a fixed ratio of the turbine torque, the torque of the turbine itself varies with the ever changing conditions of turbine speed, corresponding to the degree of torque amplification exerted on the turbine by the action on the motive fluid from the vaned reaction member which varies the torque of the feedback member as exerted on the impeller beyond that occurring at the fluid phase of operation.

The additional fluid force exerted on the turbine vanes, by the action of the vaned reaction member on the motive fluid, results from the vane angularity relationship between the discharging end portions of the turbine vanes and the entrance and discharging vane end portions of the vaned reaction member. However, this additional force, beyond the fluid clutching phase, as ratioed back from the turbine to the impeller by my feedback member, is compensated for, in the equivalent torque absorpion by my impeller vanes fashioned to encompass, correspondingly, a greater fluid volume and the discharging impeller vane end portions formed with an inclination forwardly to the direction of their motion.

The impeller vanes encompassing a greater fluid volume because of my feedback action more readily increases fluid crosswise flow, comparatively, than impellers of conventional prior art practice. The inclination forwardly to the direction of motion tends to suppress otherwise excessive crosswise fluid flow, comparatively, to that of the discharging end portions of the impeller vanes which when bent backward increases the fluid flow. The degree of impeller vane discharging end portion inclination being relative to the velocity desired for crosswise flow as to the fluid volume encompassed by these vanes.

Among the many innovations and features of this invention for improving efficiency and performance of hydrodynamic mechanical torque converter devices is the feature of the coupled relationship of my turbine to turn at an intermediate speed ratio as between the rotatable elements even when the output member stalls. Since vane-angle determination for a specific design speed can only be most favorable to that speed, the well known deficiencies increasingly occur the greater the speed to angle discrepancy by the ever changing conditions of turbine speed. However, this discrepancy is reduced as to extent by the narrower range of my turbine differential ratio action, comparatively, from that of conventional prior art practice wherein the range of turbine ratio action is extended to stall upon stall of the output member.

A modification comprising another innovation to my present invention, for restraining the rotating gearing reaction element, is provided by coupling this element to a separate vaned rotor.

In my modified arrangement with the innovation of an auxiliary rotor coupled to the rotating gearing reaction element, the impeller vanes are proportioned, as in conventional prior art practice, to encompass a volume of motive fluid corresponding to the torque of the input member as exerted thereon by the prime mover and the turbine vanes a like amount, or nearly so.

The auxiliary rotor vanes are positioned in the fluid flow path at the outer periphery of the hydraulic circuit without materially encompassing the flow path of the hydraulic circuit descending towards its inner diameter and, because of this, despite coupling to the rotating gearing reaction element exerting a ratioed force in the same direction as impeller-motion, the auxiliary rotor vanes do not appreciably contribute centrifugal force to the fluid stream as pump or impeller vanes do. Consequently, the auxiliary rotor is utilized, in my modified arrangement, for restraint of the rotating gearing action element at or somewhat near the rotating speed of the impeller.

The positioning sequence of the vaned members, of my modified arrangement, provides for the discharging of the motive fluid from the impeller vanes so as to pass between the auxiliary rotor vanes and thence impinge against the turbine vanes. The fluid impingement against the turbine vanes imparts a restraining action back against the auxiliary rotor vanes which is compensated for, substantially at least, by the torque of the rotating gearing reaction element and sustained as to speed by the force exerted on the fluid stream by the impeller vanes. This action tends to balance out the forces impressed on the auxiliary rotor and the rotating gearing reaction element operatingly coupled together so that the force exerted by the turbine to the driving member of the planetary gear set is transmitted, through differential gearing ratio action, to the output member without regenerative power feedback action, or nearly so, on the impeller nor to the prime mover.

Additional features and advantages will be apparent from the following descriptive matter and reference to the accompanying drawings, in which:

FIGURE 1 is a central vertical section taken lengthwise of the device according to one form of the invention embracing my regenerative power feedback action.

FIGURE 2 is a cross section taken at line 2—2 in FIGURE 1 showing the planetary gear set of differential action character.

FIGURE 3 is a section taken at line 3—3 in FIGURE 1 showing the vane contours of the various vaned rotors.

FIGURE 4 is a central vertical section taken lengthwise of the device, according to another form of the present invention, with the inclusion of an auxiliary rotor for restraint of the rotating gearing reaction element.

FIGURE 5 is a cross section taken at a line 5—5 in FIGURE 4 showing another type of planetary gear set of differential action character.

FIGURE 6 is a section taken at a line 6—6 in FIGURE 4 showing the vane contours of the various vaned rotors including the auxiliary rotor.

FIGURE 6a is a modification to that shown in FIGURE 6 of the vane contour relationship of the discharging end portion of the impeller vanes, the discharging end portion of the auxiliary rotor vanes and the entrance end portion of the turbine vanes.

FIGURE 6b is another modification to that shown in FIGURE 6 of the vane contour relationship of the discharging end portion of the impeller vanes, the entrance end portion of the auxiliary rotor vanes and the entrance end portion of the turbine vanes.

*Variable Speed Device—First Form*

Referring to the drawings and first to FIGURES 1 to 3, inclusive, the first form of this invention will be described in greater detail. The power input member is designated 7 and may be driven by almost any type of prime mover including internal combustion engines (not shown), and drivingly secured thereto by bolts 8 is the hydraulic torque converter front casing half 9 and welded together as at 10 is the hydraulic torque converter rear casing half 11 drivingly supporting the impeller 12. Positioned in fluid flow sequence with the impeller 12 is the turbine 13 and thence the vaned reaction member 14 to comprise the hydraulic torque converter 15. The hydraulic torque converter 15 is enclosed by the bell shaped housing 16 and bolted thereto as at 17 is the gearing housing 18 enclosing the planetary gear set 19.

The impeller vanes are designated 20, the turbine vanes 21 and the vaned reaction member vanes 22. The impeller vanes 20 have fluid entrance end portions 23 and discharging end portions 24. The turbine vanes 21 have fluid entrance end portions 25 and discharging end portions 26. The vaned reaction member vanes 22 having fluid entrance end portions 27 and discharging end portions 28. The arrows shown in FIGURE 3 indicate the direction of vane rotation and the cross lined of the specific arrow (FIGURE 3) indicates the one-way braking for the vaned reaction member 14.

The turbine 13 has formed centrally thereof a hub which at its bore is drivingly spline fitted as at 29 to turn the sleeve-like shaft 30 and this sleeve-like shaft rotatably encircles shaft 31 which is drivingly spline fitted as at 32 to the hub of the hydraulic torque converter front casing half 9 in arrangement of this shaft 31 to operatingly turn with the power input member 7 and the impeller 12. The vaned reaction member 14 has a sleeve-like hub extension 33 which is rotatably encircled by the one-way brake 34 which is anchored to the bell shaped housing 16 for preventing the vaned reaction member 14 from turning oppositely to the turbine 13 and impeller 12.

Drivingly coupled to shaft 31 is sun gear 35 (shown integral therewith) in arrangement to operatingly turn with the impeller 12 for restraint of this gear functioning as the rotating gearing reaction element or the feedback member. Drivingly coupled to the sleeve-like shaft 30 is the ring gear 36 functioning as the driving member by coupling to the turbine 13. Coacting in pairs pinion 37 (FIGURE 2) meshes with both the sun gear 35 and the other pinion 38 which in turn meshes with ring gear 36. Pinions 37 and 38 are supported on alike shafts 39 which in turn are supported by the planet pinion carrier 40. This carrier 40 functions as the planetary gear set output member and is drivingly coupled with output shaft 41 which is rotatably supported by the inner race of ball bearing 42 and the outer race thereof is supported by the gearing housing 18 and secured to position therein by retainer 43 bolted as at 44 while the inner race of this ball bearing 42 is held to axial position against a shoulder of the output shaft 41 by snap ring 45. An oil seal 46 is pressed in a recess of retainer 43 for sealing contact with an annular surface of the output shaft 41.

In the operation of my first form of the variable speed device, assume that the power input member 7 is drivingly coupled to a prime mover (not shown) which can be one of several types including an internal combustion carburetor engine, a diesel engine power source, or an electric motor, etc.

With motive fluid provided for the hydraulic converter 15 and the input member 7 being rotated by the prime mover and therewith the impeller 12 with the vanes 20 thereof whirling the fluid in the direction of impeller motion. At the initial power phase, the output member 40 being stalled, by the load impressed thereon, the turbine 13 turns at a differential ratio intermediate of the stalled output member 40 and the turning speed of the sun gear 35 with the impeller operatingly coupled therewith.

During the initial phase of operation for picking up a load, the impeller vanes 20 impinge the motive fluid against the turbine vanes 21, with the output member 40 stalled and the turbine 13 rotating at its greatest differential ratio, the crosswise or "vortex flow" of the motive fluid is at its maximum velocity, relative to a specific impeller speed, and the fluid stream passing from the turbine vanes 21 impinges against the vanes 22 of the vaned reaction member 14 held from reverse rotation by the one-way brake 34. At this operational phase, the torque of the prime mover as transmitted by the impeller 12 plus the torque exerted back fluidly from the action of the vaned reaction member 14 is the combined fluid effort exerted on the turbine 13. Therefore, the impeller vanes 20 are fashioned as required to absorb the torque of the input member 7 as exerted by the prime mover plus, partially at least, the sun gear 35 ratio of the feedback torque from the maximum torque exerted on the ring gear 36 by the turbine 13 coupled therewith.

The force exerted fluidly back on the rotating turbine vanes 21 by the vanes 22 of the vaned reaction member 14, when held stationary by the "vortex flow" phase of operation, is in the nature of a throttling action on the fluid stream which actually increases, correspondingly, the fluid pressure loading on the turbine vanes 21 over that on the impeller vanes 20 for this torque amplifying phase of turbine 13 operation. Therefore, the turbine vanes 21 are fashioned to encompass a fluid volume to include the factor of the feedback member 35 torque at the "fluid clutching" phase of operation. The additional factor of torque amplification exerted on the turbine vanes 21, during predominately "vortex flow" influence, is fluidly absorbed, or nearly so, by the angularity relationship of the fluid entrance vane end portions and the discharging vane end portions of the vaned members.

For reconciling the resulting force factor relationship, before mentioned, by different fluid volume vane encompassing proportions between the impeller 12 and the turbine 13 in the arrangement of the impeller vanes 20 encompassing somewhat the greater volume, this difference is compensated for, respecting torque absorption correspondingly, by the degree of angular inclination forwardly to the direction of rotation of the fluid discharging vane end portions 24 of the impeller vanes 20 (FIGURE 3). This inclination forward has the effect of suppressing fluid flow velocity while impeller vane inclination backward to the direction of motion, comparatively, enhances the flow velocity which are compensating factors for reconciling conditions of vane proportioning.

The higher efficiency of transmitting turbine torque through the infinitely ever widening differential gearing ratio output, of my arrangement, from that of the rate of turbine speed diminishment will be better understood as charted from the following example of gear proportioning of the type of planetary gear set 19 disclosed by FIGURES 1 and 2. Assuming the sun gear 35 has twenty-seven teeth, and the ring gear 36 sixty-nine teeth. As set forth in the following chart for each listed speed ratio diminishment of the turbine, at each side thereof is the relative differential speed ratio of,

| Carrier output | Ring gear turbine | Sun gear impeller |
|---|---|---|
| .918 | .950 | 1.000 |
| .836 | .900 | 1.000 |
| .754 | .850 | 1.000 |
| .671 | .800 | 1.000 |
| .589 | .750 | 1.000 |
| .507 | .700 | 1.000 |
| .425 | .650 | 1.000 |
| .343 | .600 | 1.000 |
| .261 | .550 | 1.000 |
| .179 | .500 | 1.000 |
| .096 | .450 | 1.000 |
| .014 | .400 | 1.000 |
| .000 | .391 | 1.000 |

In the instance of the foregoing differential ratioing chart, the sun gear 35 feedback ratio is .281 of the tubine torque throughout all phases of operation, under load stress. From this chart it will be noticed that with the gearing proportions as set forth, the efficiency of the turbine at a ratio of .500 is projected through my more efficient gearing concept to the output member thereof at its relative differential ratio of .179 to the 1.000 ratio of the input.

*Variable Speed Device—Second Form*

In the modified form of my variable speed device, shown in FIGURES 4 to 6b inclusive, the power input member is designated 107 and drivingly secured thereto by bolts 108 is the hydraulic torque converter front casing half 109 and welded together as at 110 is the hydraulic torque converter rear casing half 111 drivingly supporting impeller 112. Positioned in fluid flow sequence with the impeller 112 is the auxiliary rotor 113, thence the turbine 114 and the vaned reaction member 115 to comprise the hydraulic torque converter 116. The hydraulic torque converter 116 is enclosed by the bell shaped housing 117 and bolted thereto as at 118 is the gearing housing 119 enclosing the planetary gear set 120.

The impeller vanes are designated 121, the auxiliary rotor vanes 122, the turbine vanes 123 and the vaned reaction member vanes 124. The impeller vanes 121 have fluid entrance end portions 125 and discharging end portions 126, the auxiliary rotor vanes 122 have fluid entrance end portions 127 and discharging end portions 128, the turbine vanes 123 have fluid entrance end portions 129 and discharging end portions 130, the vaned reaction member vanes 124 have fluid entrance end portions 131 and discharging end portions 132. The arrows in FIGURE 6 indicate the direction of vane rotation and the crossed line of the specific arrow indicates one-way braking for the vaned reaction member 115.

Modifications to vaning contours for my second form of variable speed device are illustrated by FIGURE 6a of which the impeller vanes are designated 121a, the auxiliary rotor vanes 122a, the turbine vanes 123. Included in the modifications are the impeller vanes 121a form changed at their fluid discharging end portions 126a to extend parallel to the axis of the impeller 121, the auxiliary rotor vanes 122a form changed to include at their discharging end portions 128a an inclination forward to the direction of rotation, the turbine vanes 123 as shown do not indicate modification.

Still other modifications to vaning contours for my second form of variable speed device are illustrated by FIGURE 6b of which the impeller vanes are designated 121b, the auxiliary rotor vanes 122b and the impeller vanes 123. Included in these modifications are the impeller vanes 121b form changed at their fluid discharging end portions 126b to incline backward to the direction of rotation, the auxiliary rotor vanes 122b form changed to incline forwardly to the direction of rotation at their fluid entrance end portions 127b. The turbine vanes 123 as shown do not indicate modification.

The turbine 114 has formed centrally thereof a hub which at its bore is drivingly splined as at 133 to turn the sleeve-like shaft 134 and this sleeve-like shaft rotatably encircles shaft 135 which is drivingly spline fitted as at 136 to the hub bore of the auxiliary rotor 113 to turn therewith and the forward end of shaft 135 is journalled in the hub bore 137 of the hydraulic torque converter front casing half 109. The vaned reaction member 115 has a sleeve-like hub extension 138 rotatably encircling the sleeve-like shaft 134. This sleeve-like hub extension 138 is encircled by the one-way brake 139 which in turn is anchored to the bell shaped housing 117 for preventing the vaned reaction member 115 from turning oppositely to the turbine 114 and impeller 112.

Sun gear 140 is drivingly coupled to shaft 135 (shown integral therewith) in arrangement to turn with the auxiliary rotor 113 for this gear to function as the rotating gearing reaction element. Pinion gears 141 are rotatably supported on shafts 142 and the pinion 141 is drivingly meshed with the sun gear 140 and ring gear 143. The shafts 142 are supported by planet pinion carrier 144 which is coupled to turn with the sleeve-like shaft 134 and the turbine 114 for this carrier 144 to function as the driving member of the planetary gear set 120. The ring gear 143 functions as the planetary gear set output member and is coupled with the output shaft 145 to turn therewith. This shaft 145 is rotatably supported by the inner race of ball bearing 146 and the outer race thereof is supported by gearing housing 119 and secured to position therein by retainer 147 bolted as at 148 while the inner race of this ball bearing 146 is held to axial position against a shoulder of the output shaft 145 by snap ring 149. An oil seal 150 is pressed in a recess of retainer 147 for sealing contact with an annular surface of the output shaft 145.

During the initial phase of the power effort in picking up a load, the impeller vanes 121 set the motive fluid in motion with a strong crosswise flow velocity discharging from the impeller vanes 121 and flowing between the auxiliary rotor vanes 122 to thence impinge against the turbine vanes 123 with a component of force in the direction and relative to the impeller motion for, in a sense, fluid clutching the auxiliary rotor vanes 122 to a speed somewhat in unison with the impeller 112 rotation so as to restrain the sun gear 140 therewith in its function as the rotating gearing reaction element.

The ratioed reaction force impressed on the sun gear 140, stemming from the torque of the turbine 114 as transmitted to the carrier 144 coupled therewith, tends to rotate the auxiliary rotor vanes 122 faster than the impeller vanes 121 rotating in the same direction. However, the impingement of the motive fluid against the turbine blades 123 has a restraining action back against the auxiliary rotor vanes 122 which is, at least partially, compensated for by the ratio of supporting reaction force transmitted to the auxiliary rotor vanes 122 which are sustained as to rotating speed by the fluid stream flowing between these vanes 122 as passing from the impeller vanes 121. This force of restraint exerted fluidly by the impingement against the turbine vanes 123 can exceed the factor of ratioed reaction torque supporting the rotation of the auxiliary rotor vanes 122. Therefore, it is preferred that these vanes 122 be proportioned to substantially, at least, sustain the torque as transmitted fluidly by the impeller vanes.

Because, as aforementioned, the auxiliary rotor vanes 122 do not appreciably exert centrifugal force to the fluid stream, consequently, the auxiliary rotor 113 does not assume any fluid driving action away from the impeller 112. The sun gear 140 is restrained to an approximate speed to that of the impeller 112 rotation by the fluid clutching action on the auxiliary rotor vanes 122 and the reaction torque impressed on the sun gear 140 is balanced off by the fluid impingement restraint of at least equal magnitude impressed on the auxiliary rotor vanes 122 so that the turbine torque is efficiently transmitted by the carrier 144 for torque conversion of considerable multiplication at high efficiency by the planetary gear set 120.

In my second form of variable speed device, the planetary gear set 120, illustrated in FIGURES 4 and 5, is optionally of a different type from that shown in FIGURES 1 and 2 of the device and for the driving and output action different elements are utilized to achieve similar differential action. For an example of a different gear proportioning of the planetary gear set 120 (FIGURES 4 and 5) assume that the sun gear 140 has thirty teeth and the ring gear 143 has sixty teeth, then as set forth in the following chart, for each listed speed ratio diminishment of the turbine 114 and the carrier 144 coupled together, at each side thereof is the relative differential speed ratio of,

| Ring gear output | Carrier turbine | Sun gear auxiliary rotor |
|---|---|---|
| .925 | .950 | 1.000 |
| .850 | .900 | 1.000 |
| .775 | .850 | 1.000 |
| .700 | .800 | 1.000 |
| .625 | .750 | 1.000 |
| .550 | .700 | 1.000 |
| .475 | .650 | 1.000 |
| .400 | .600 | 1.000 |
| .325 | .550 | 1.000 |
| .250 | .500 | 1.000 |
| .175 | .450 | 1.000 |
| .100 | .400 | 1.000 |
| .025 | .350 | 1.000 |
| .000 | .333 | 1.000 |

From this latter chart of differential ratio action, the sun gear 140 ratio of the turbine 114 torque is .250. It will be observed that the turbine torque efficiency at a ratio of .500 is projected through the gear set 120 to the output speed ratio at .250 with the just before mentioned gear proportioning is of a different ratio than the preceding proportions set forth. Other ratios may be utilized for lesser or even greater differential effects for realizing a wide latitude for design practice.

In reference to the vane modifications illustrated by FIGURE 6a of the second form of my variable speed device, the modified impeller vanes 121a at their fluid discharging ends 126a are formed to discharge the motive fluid in a direction, therefrom, parallel to the axis of vane motion and is received in a like direction by the fluid entrance end portions 127 of the auxiliary rotor vanes 122a, however, the discharging vane end portions 128a thereof incline forwardly to the direction of their motion and thus deflect the fluid stream in passing therefrom to impinge the turbine vanes 123. This deflecting action to the fluid stream provides a further restraining effort to the auxiliary rotor 113 and sun gear 140 as may be desired.

The vane modifications as disclosed in FIGURE 6b provides, the impeller vanes 121b at their discharging end portions 126b formed to incline backward to the direction of their motion which enhances the fluid crosswise flow velocity and efficiency of cooperation with the auxiliary rotor vanes 122b formed at their fluid entrance end portions 127b to incline forwardly to their direction of motion.

This latter vane modification exerts more influence on the crosswise flow velocity because of the fluid directional entrance angle inclination relationship of the auxiliary rotor vanes 122b to that of the fluid discharging angle of the impeller vanes 121b can be such as to cause the auxiliary rotor vanes 122b to reach the point where these vanes 122b just about but cannot quite take over the fluid drive from the impeller vanes 121b for the reason of the lesser torque exerted to the auxiliary rotor vanes 122b.

The angular inclination forwardly of the fluid entrance end portions 127b of the auxiliary rotor vanes 122b can be increased to the extent, in cooperative angular fluid discharging adjustment to vanes 121b, whereby the vanes 122b actually add impetus to the fluid stream or even to assist the fluid drive of the impeller, however, from this point on the vane proportion relationships becomes a factor of consideration. This impetus or assist results from the direction of vane 122b fluid entrance inclination, its angle for overrun as to desired speed of motion relative to that of impeller vanes 122b and their fluid discharging angle.

In reference to the vaning arrangement of FIGURE 6, the impeller vane fluid discharging end portions 126 are shown inclining forwardly, instead, if the impeller vanes 121b of FIGURE 6b were substituted with their fluid discharging end portions 126b inclining backward, the fluid restraining action on the auxiliary rotor vanes 122 would be increased because of the inclining direction of the fluid stream. In this latter instance, discharging from the impeller vanes would more effectively oppose the overrunning reaction exerted on the auxiliary rotor vanes.

A different type of planetary gear set is disclosed in the first form of my present variable speed devices (FIGURES 1 to 3, inclusive) to the one disclosed in the second form (FIGURES 4 to 6b, inclusive) for obtaining similar differential characteristics. However, wherein action from one gear is transmitted through paired or double pinion action, such as shown in FIGURES 1 and 2, to another gear, the turbine torque is transmitted to a gear as the driving member of the gear set and the planet pinion carrier functions as the output member thereof. Wherein the action from one gear is transmitted by single pinion action to another gear, the turbine torque is transmitted to a planet pinion carrier as the driving member of the gear set and the output torque is transmitted by a gear functioning as the output member thereof.

Two examples of gear proportions and charts of differential speed ratio relationships have been set forth together with corresponding specific ratios of reaction torque resultingly imposed on the rotating reaction elements involved. Other gear proportions may be utilized without departing from the scope of this invention.

Mechanisms for reversing the direction of the output drive and for stepped up exertion of down hill braking restraint to a vehicle are of common practice and any of several types may be utilized for operation from the output members of my present devices without departing from the scope of my invention. In many industrial applications wherein reversal of output drive and down hill braking are not features required, my present devices as disclosed herein are of sufficient arrangement for utilization except for the addition of conventional lubricating and hydraulic converter fluid filling facilities (not shown).

The versatility of the arrangements provided by this invention is broad; for instance, the gearing portion of my concept will multiply torque when only the impeller and the turbine transfer torque merely functioning as a fluid coupling without the aid of a vaned reaction member for amplifying the fluid force exerted on the turbine and such arrangement has usage in several fields.

Because of the devices of my present disclosures have capabilities of substantially multiplying torque at relatively high efficiencies, utilization in a number of fields is apparent and the invention is not to be regarded as limited to any specific illustration or detailed descriptive matter herein but to include changes and variations within the terms of the claims herein.

Having thus described my invention, I claim:

1. A variable speed device including a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, and a turbine arranged to receive torque from said motive fluid and coupled to a first planetary gear set element for turning said element, said first element being arranged to function as the driving member of said gear set, said gear set having a second element arranged to function as a rotating gearing action element and coactingly coupled with the vaned impeller, and a third element arranged to function as the planetary gear set output member responsive to the differential ratio action of the first and second mentioned elements, the vanes of said impeller and said turbine fashioned to fluidly absorb the torque of the power input member plus the torque exerted on the rotating gearing reaction element.

2. A variable speed device including a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, a turbine arranged to receive torque from said motive fluid and coupled to a first planetary gear set element for turning said element, said first element being arranged to function as the driving member of said gear set, said gear set having a second element arranged to function as a rotating gearing reaction element coactingly coupled with the vaned impeller, and a third element arranged to function as the planetary gear set output member responsive to the differential ratio action of the first and second mentioned elements, vane series of said impeller and said turbine each with the vanes thereof fashioned to absorb the torque equivalent of the power input member torque plus partially at least the torque exerted on the rotating gearing reaction element.

3. A variable speed device including a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, and a turbine arranged to receive torque from said motive fluid and coupled to a first planetary gear set element for turning said element, said first element being arranged to function as the driving member of said gear set, said gear set having a second plentary gear set element arranged to function as a rotating gearing reaction element coactingly coupled with the vaned impeller, and a third element arranged to function as the planetary gear set output member responsive to the differential ratio action of the first and second mentioned elements, a vane series of said impeller and said turbine each with the vanes thereof fashioned to absorb the torque equivalent of the power input member torque plus the torque exerted on the rotating gearing reaction element and in further arrangement of the impeller vanes proportioned to encompass a greater fluid volume than the turbine vanes.

4. A variable speed device including a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, and a turbine arranged to receive torque from said motive fluid and coupled to a first planetary gear set element for turning said element, said first element being arranged to function as the driving member of said gear set, said gear set having a second planetary gear set element arranged to function as a rotating gearing reaction element coactingly coupled with the vaned impeller, and a third element arranged to function as the planetary gear set output member responsive to the differential ratio action of the first and second mentioned elements, vane series of said impeller and said turbine each with vanes thereof fashioned to absorb the torque equivalent of the power input member torque plus partially at least the torque exerted on the rotating gearing reaction element and in further arrangement of the impeller vanes formed at their fluid discharging end portions to incline forwardly to the direction of their motion.

5. A variable speed device including a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, and a turbine arranged to receive torque from said motive fluid and coupled to a first planetary gear set element for turning said element, said first element being arranged to function as the driving member of said gear set, said driving member with a second element and a third element of the planetary gear set together with planet pinions thereof in a ratio action arrangement for dividing the turbine torque into unequal portions, said second element coactingly coupled to the vaned impeller and arranged as a feedback member for transmitting the minor portion of the turbine torque drivingly back to said impeller, the vanes of said impeller and said turbine fashioned to absorb the torque equivalent exerted by the power input member plus partially at least the torque exerted by said feedback member, said third element arranged to transmit the major portion of the turbine torque and to function as the output member of said gear set.

6. A variable speed device including a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, and a turbine arranged to receive torque from said motive fluid and coupled to a first planetary gear set element for turning said element, said first element being arranged to function as the driving member of said gear set, said driving member with a sun gear element and a third element of the planetary gear set together with planet pinions thereof in a ratio action arrangement for dividing the turbine torque into unequal portions, said sun gear coactingly coupled to the vaned impeller and arranged as a feedback member for transmitting the minor portion of the turbine torque drivingly back to said impeller, the vanes of said impeller and said turbine fashioned to absorb the torque equivalent exerted by the power input member plus partially at least the torque exerted by said feedback member, said third element arranged to transmit the major portion of the turbine torque and to function as the output member of said gear set.

7. A variable speed device including a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, and a turbine arranged to receive torque from said motive fluid and coupled to a first planetary gear set element for turning said element, said first element being arranged to function as the driving member of said gear set, said driving member with a sun gear element and a planet pinion carrier element of the planetary gear set together with planet pinions thereof in a ratio action arrangement for dividing the turbine torque into unequal portions, said sun gear coactingly coupled to the vaned impeller and arranged as a feedback member for transmitting the minor portion of the turbine torque drivingly back to said impeller, the vanes of said impeller and said turbine fashioned to absorb the torque equivalent exerted by the power input member plus partially at least the torque exerted by said feedback member, said pinion carrier arranged to transmit the major portion of the turbine torque and to function as the output member of said gear set.

8. A variable speed device including a power input member, a planeary gear set of differential action character and hydrodynamic means in coupled arrangement with said gear set, said hydrodynamic means containing a motive fluid and having a vaned impeller drivingly coupled to said power input member for transmitting driving torque to said motive fluid, and a turbine arranged to receive torque from said motive fluid and coupled to a first planetary gear set element for turning said element, said first element being arranged to function as the driving member of said gear set, said driving member with a sun gear and a planet pinion carrier element of the planetary gear set together with planet pinions thereof in a ratio action arrangement for dividing the turbine torque into unequal portions, said sun gear coactingly coupled to the vaned impeller and arranged as a feedback member for transmitting the minor portion of the turbine torque drivingly back to said impeller, vane series of said impeller and said turbine each with the vanes thereof fashioned to absorb the torque equivalent of the power input member plus partially at least the torque exerted on the feedback member and in further arrangement of the impeller vanes proportioned to encompass a greater fluid volume than the turbine vanes, said pinion carrier arranged to transmit the major portion of the turbine torque and to function as the output member.

9. A variable speed device including a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, and a turbine arranged to receive torque from said motive fluid and coupled to a ring gear element of the planetary gear set for turning said ring gear element, said ring gear arranged to function as the driving member of said gear set, a planet pinion carrier rotatably supporting planet pinions arranged coactingly in pairs with one of each pair meshed to said ring gear and the other meshed to a sun gear arranged as a feedback member coactingly coupled to the vaned impeller, vane series of said impeller and said turbine each with the vanes thereof fashioned to absorb the torque equivalent of the power input member plus the torque exerted on said feedback member, said pinion carrier arranged to function as the output member of said gear set.

10. In a variable speed device, a power input member, hydrodynamic means including a vaned impeller coupled to said power input member, a vaned reaction member and a turbine, a planetary gear set having an element thereof coupled to said turbine and arranged to function as the driving member of said gear set, said driving member in coacting arrangement with planet pinions of said gear set to transmit the turbine torque to second and third elements of the planetary gear set in unequal ratioed portions, said second element coactingly coupled to the vaned impeller and arranged as a feedback member for transmitting the minor portion of the turbine torque drivingly back to said impeller, the vanes of said impeller and said turbine fashioned to absorb the torque equivalent exerted by the power input member plus partially at least the torque exerted by said feedback member, said third element arranged to impart the major portion of the turbine torque and to function as the output member of said gear set.

11. In a variable speed device, a power input member, hydrodynamic means including a vaned impeller coupled to said power input member, a vaned reaction member and a turbine, a planetary gear set having planet pinions and an element coupled to said turbine and arranged to function as the driving member of said gear set, said driving member in coacting arrangement with said planet pinions to transmit turbine torque to a sun gear element and a third element of the planetary gear set in unequal ratioed portions, said sun gear coactingly coupled to the vaned impeller and arranged as a feedback member for transmitting the minor portion of the turbine torque drivingly back to said impeller, the vanes of said impeller and said turbine fashioned to absorb the torque equivalent exerted by the power input member plus partially at least the torque exerted by said feedback member, said third element arranged to impart a major portion of the turbine torque and to function as the output member of said gear set.

12. In a variable speed device, a power input member, hydrodynamic means including a vaned impeller coupled to said power input member, a vaned reaction member and a turbine, a planetary gear set having planet pinions and an element coupled to said turbine and arranged to function as the driving member of said gear set, said driving member in coacting arrangement with said planet pinions to transmit the turbine torque to a sun gear element and a planet pinion carrier element of said gear set in unequal ratioed portions, said sun gear element coactingly coupled to the vaned impeller and arranged as a feedback member for transmitting the minor portion of the turbine torque drivingly back to said impeller, the vanes of said impeller and said turbine fashioned to absorb the torque equivalent exerted by the power input member plus partially at least the torque exerted by said feedback member, said pinion carrier element arranged to impart the major portion of the turbine torque and to function as the output member of said gear set.

13. In a variable speed device, a power input member, hydrodynamic means including a vaned impeller coupled to said power input member, a vaned reaction member and a turbine, a planetary gear set having a ring gear coupled to said turbine, a sun gear and a planet pinion carrier rotatably supporting planet pinions arranged coactingly in pairs of which one is meshed to said sun gear and the other to said ring gear, said ring gear arranged to function as the driving member for transmitting the turbine torque to said sun gear and the pinion carrier in unequal ratioed portions, said sun gear coactingly coupled to the vaned impeller and arranged as a feedback member for transmitting the minor portion of the turbine torque drivingly back to said impeller, the vanes of said impeller and said turbine fashioned to absorb the torque equivalent exerted by the power input member plus partially at least the torque exerted by said feedback member, said pinion carrier arranged to impart the major portion of the turbine torque and to function as the output member of said gear set.

14. In a variable speed device, a power input member, hydrodynamic means including a vaned impeller coupled to said power input member, a vaned reaction member and a turbine, a planetary gear set having planet pinions and an element coupled to said turbine and arranged to function as the driving member of said gear set, said driving member in coacting arrangement with said planet pinions to transmit turbine torque to second and third elements of the planetary gear set in unequal ratioed portions, said second element coactingly coupled to the vaned impeller and arranged as a feedback member for transmitting the minor portion of the torque drivingly back to said impeller, said third element arranged to impart the major portion of the turbine torque and to function as the output member of said gear set, vane series of said impeller and said turbine each with the vanes thereof fashioned to absorb the torque equivalent of the power input member torque plus partially at least the torque exerted on the feedback member and in further arrangement of the impeller vanes proportioned to encompass a greater fluid volume than the turbine vanes.

15. In a variable speed device, a power input member, hydrodynamic means including a vaned impeller coupled to said power input member, a vaned reaction member and a turbine, a planetary gear set having planet pinions and an element coupled to said turbine and arranged to function as a driving member, said driving member in coacting arrangement with said planet pinions to transmit turbine torque to second and third elements of the planetary gear set in unequal ratioed portions, said second element coactingly coupled to the vaned impeller and arranged as a feedback member for transmitting the minor portion of the turbine torque drivingly back to said impeller, said third element arranged to impart the major portion of the turbine torque and to function as the output member of said gear set, vane series of said impeller and said turbine each with the vanes thereof fashioned to absorb the torque equivalent of the power input member torque plus partially at least the torque exerted on the feedback member and in further arrangement of the impeller vanes formed at their fluid discharging end portions to incline forwardly to the direction of their motion.

16. In a variable speed device, a power input member, hydrodynamic means including a vaned impeller coupled to said power input member, a vaned reaction member and a turbine, a planetary gear set having planet pinions and an element thereof coupled to said turbine and arranged to function as a driving member of said gear set, said driving member in coacting arrangement with said planet pinions to transmit turbine torque to second and third elements of the planetary gear set in unequal ratioed portions, said second element coactingly coupled to the vaned impeller and arranged as a feedback member for transmitting the minor portion of the turbine torque drivingly back to said impeller, said third element arranged to impart the major portion of the turbine torque and to function as the output member of said gear set, vane series of said impeller and said turbine each with the vanes thereof fashioned to absorb the torque equivalent of the power input member torque plus partially at least the torque exerted on the feedback member and in further arrangement of the impeller vanes formed to encompass a greater fluid volume than the turbine vanes and at their fluid discharging end portions to incline forwardly to the direction of their motion.

17. In a variable speed device, a power input member, hydrodynamic means including a vaned impeller coupled to said power input member, a vaned reaction member and a turbine, a planetary gear set having planet pinions and an element coupled to said turbine and arranged to function as the driving member of said gear set, said driving member in coacting arrangement with said planet pinions to transmit turbine torque to a sun gear element and a planet pinion carrier element of the planetary gear set in unequal ratioed portions, said sun gear element coactingly coupled to the vaned impeller arranged as a feedback member for transmitting the minor portion of the turbine torque drivingly back to said impeller, said pinion carrier element arranged to impart the major portion of the turbine torque and to function as the output member of said gear set, vane series of said impeller and said turbine each with the vanes thereof fashioned to absorb the torque equivalent of the power input member torque plus partially at least the torque exerted on the feedback member and in further arrangement of the impeller vanes formed to encompass a greater fluid volume than the turbine vanes and at their fluid discharging end portions to incline forwardly to the direction of their motion.

18. In a variable speed device, a power input member, hydrodynamic means including a vaned impeller coupled to said power input member, a vaned reaction member and a turbine, a planetary gear set having a ring gear coupled to said turbine, a sun gear and a planet pinion carrier rotatably supporting planet pinons arranged coactingly in pairs of which one is meshed to said sun gear and the other to said ring gear, said ring gear arranged to function as the driving member for transmitting turbine torque to the sun gear and the pinion carrier in unequal ratioed portions, said sun gear coactingly coupled to the vaned impeller arranged to transmit the minor portion of the turbine torque and to function as a feedback member coactingly coupled to said impeller, said pinion carrier arranged to impart the major portion of the turbine torque and to function as the output member of said gear set, vane series of said impeller and said turbine each with the vanes thereof fashioned to absorb the torque equivalent of the power input member torque plus partially at least the torque exerted on the feedback member and in further arrangement of the impeller vanes formed to encompass a greater fluid volume than the turbine vanes and at their fluid discharging end portions to incline forwardly to the direction of their motion.

19. A variable speed device including, a power input member, a planetary gear set of differential action character and hydrodynamic means in coupled arrangement with said gear set, said hydrodynamic means containing a motive fluid and having a vaned impeller drivingly coupled to said power input member for transmitting driving torque to said motive fluid, a turbine arranged to receive torque from said motive fluid and coupled to a first planetary gear set element for turning said element, said first element being arranged to function as the driving member of said gear set, a vaned auxiliary rotor coupled to turn with a second planetary gear set element arranged to to function as a rotating gearing reaction element of said gear set, said gear set having a third element arranged to function as the planetary gear set output member responsive to the differential ratio action of the first and second mentioned elements, said auxiliary rotor having vanes fashioned for fluidly restraining partially at least the torque exerted on the rotating gearing reaction element.

20. A variable speed device including, a power input member, a planetary gear set of differential action character and hydrodynamic means in coupled arrangement with said gear set, said hydrodynamic means containing a motive fluid and having a vaned impeller drivingly coupled to said power input member for transmitting driving torque to the motive fluid, a turbine coupled to a first planetary gear set element arranged to function as the driving member of said gear set, a vaned auxiliary rotor coupled to turn with a second planetary gear set element arranged to function as a rotating gearing reaction element of said gear set, said gear set having a third element arranged to function as the planetary gear set output member responsive to the differential ratio action of the first and second mentioned elements, said auxiliary rotor having vanes fashioned to encompass a fluid volume for restraining the torque of the rotating gearing reaction element for maintaining the speed thereof to substantially that of the vaned impeller.

21. A variable speed device including, a power input member, a planetary gear set of differential action character and hydrodynamic means in coupled arrangement with said gear set, said hydrodynamic means containing a motive fluid and having a vaned impeller drivingly coupled to said power input member for transmitting driving torque to the motive fluid, a turbine coupled to turn a first planetary gear set element arranged to function as the driving member of said gear set, a vaned auxiliary rotor coupled to turn with a second planetary gear set element arranged to function as a rotating gearing reaction element of said gear set, said gear set having a third element arranged to function as the planetary gear set output member responsive to the differential ratio action of the first and second mentioned elements, said auxiliary rotor having vanes fashioned for fluidly restraining the torque of the rotating gearing reaction element and in further cooperative arrangement with the impeller vanes having fluid discharging end portions inclining forwardly to their direction of motion.

22. A variable speed device including, a power input member, a planetary gear set of differential action character and hydrodynamic means in coupled arrangement with said gear set, said hydrodynamic means containing a motive fluid having a vaned impeller drivingly coupled to said power input member for transmitting driving torque to the motive fluid, a turbine coupled to turn a first planetary gear set element arranged to function as the driving member of said gear set, a vaned auxiliary rotor coupled to turn with a second planetary gear set element arranged to function as a rotating gearing reaction element of said gear set, said gear set having a third element arranged to function as the planetary gear set output member responsive to the differential ratio action of the first and second mentioned elements, said auxiliary rotor having vanes fashioned for fluidly restraining the torque of the rotating gearing reaction element and in further cooperative arrangement with the impeller vanes having fluid discharging end portions inclining backward clining forwardly to their direction of motion.

23. A variable speed device including, a power input member, a planetary gear set of differential action character and hydrodynamic means in coupled arrangement with said gear set, said hydrodynamic means containing a motive fluid having a vaned impeller drivingly coupled to said power input member for transmitting driving torque to the motive fluid, a turbine coupled to turn a first planetary gear set element arranged to function as the driving member of said gear set, a vaned auxiliary rotor coupled to turn with a second planetary gear set element arranged to function as a rotating gearing reaction element of said gear set, said gear set having a third element arranged to function as the planetary gear set output member responsive to the differential ratio action of the first and second mentioned elements, said auxiliary rotor having vanes fashioned for fluidly restraining the torque of the rotating gearing reaction element and the latter vanes further arranged with the fluid discharging end portions inclining forwardly to the direction of their motion.

24. A variable speed device including, a power input member, a planetary gear set of differential action character and hydrodynamic means in coupled arrangement with said gear set, said hydrodynamic means containing a motive fluid having a vaned impeller drivingly coupled to said power input member for transmitting driving torque to the motive fluid, a turbine coupled to turn a first planetary gear set element arranged to function as the driving member of said gear set, a vaned auxiliary rotor coupled to turn with a second planetary gear set element arranged to function as a rotating gearing reaction element of said gear set, said gear set having a third element arranged to function as the planetary gear set output member responsive to the differential ratio action of the first and second mentioned elements, said auxiliary rotor having vanes fashioned for fluidly restraining the torque of the rotating gearing reaction element and the latter vanes further arranged with the fluid entrance end portions inclining forwardly to their direction of motion.

25. A variable speed device including, a power input member, a planetary gear set of differential action character and hydrodynamic means in coupled arrangement with said gear set, said hydrodynamic means containing a motive fluid having a vaned impeller drivingly coupled to said power input member for transmitting driving torque to the motive fluid, a turbine coupled to turn a first planetary gear set element arranged to function as the driving member of said gear set, a vaned auxiliary rotor coupled to turn with a second planetary gear set element arranged to function as a rotating gearing reaction element of said gear set, said gear set having a third element arranged as the planetary gear set output member responsive to the differential ratio action of the first and second mentioned elements, said auxiliary rotor having vanes fashioned with their fluid entrance end portions inclining forwardly in cooperation with the fluid discharging end portions of the impeller vanes formed inclining backward to the direction of their motion.

26. In a variable speed device, a power input member, hydrodynamic means including a vaned impeller coupled to said power input member, a vaned reaction member, a vaned auxiliary rotor and a turbine, a planetary gear set having an element thereof coupled to said turbine and arranged to function as the driving member of said gear set, said driving member in coacting arrangement with planet pinions of said gear set to transmit the turbine torque to a second and third element of the planetary gear set in unequal ratioed portions, said second element arranged to restrain the minor portion of the turbine torque to function as a rotating gearing reaction element coactingly coupled to the vaned auxiliary rotor, said third element arranged to impart the major portion of the turbine torque and to function as the output member of said gear set, said auxiliary rotor having vanes fashioned for fluid restraint of at least substantially the torque of the rotating gearing reaction element.

27. In a variable speed device, a power input member, hydrodynamic means including a vaned impeller coupled to said power input member, a vaned reaction member, a vaned auxiliary rotor and a turbine, a planetary gear set having an element thereof coupled to said turbine and arranged to function as the driving member of said gear set, said driving member in coacting arrangement with planet pinions of said gear set to transmit the turbine torque to a sun gear element and a third element of the planetary gear set in unequal ratioed portions, said sun gear arranged to restrain the minor portion of the turbine torque and to function as a rotating gearing reaction element coactingly coupled to the vaned auxiliary rotor, said third element arranged to impart the major portion of the turbine torque and to function as the output member of said gear set, said auxiliary rotor having vanes fashioned for fluid restraint of at least substantially the torque of the rotating gearing reaction element.

28. In a variable speed device, a power input member, hydrodynamic means including a vaned impeller coupled to said power input member, a vaned reaction member, a vaned auxiliary rotor and a turbine, a planetary gear set having a planet pinion carrier element coupled to said turbine and arranged to function as the driving member of said gear set, said pinion carrier element rotatably supporting planet pinions coactingly arranged to transmit the turbine torque to a sun gear element and a third element of the planetary gear set in unequal ratioed portions, said sun gear element arranged to restrain the minor portion of the turbine torque and to function as a rotating gearing reaction element coactingly coupled to the vaned auxiliary rotor, said third element arranged to impart the major portion of the turbine torque and to function as the output member of said gear set, said auxiliary rotor having vanes fashioned for fluid restraint of at least substantially the torque of the rotating gearing reaction element.

29. In a variable speed device, a power input member, hydrodynamic means including a vaned impeller coupled to said power input member, a vaned reaction member, a vaned auxiliary rotor and a turbine, a planetary gear set having a planet pinion carrier element coupled to said turbine and arranged to function as the driving member of said gear set, said pinion carrier element rotatably supporting planet pinions coactingly arranged to transmit the turbine torque to a sun gear element and a ring gear element of the planetary gear set in unequal ratioed portions, said sun gear element arranged to restrain the minor portion of the turbine torque and to function as a rotating gearing reaction element coactingly coupled to the vaned auxiliary rotor, said ring gear element arranged to impart the major portion of the turbine torque and to function as the output member of said gear set, said auxiliary rotor having vanes fashioned for fluid restraint of at least substantially the torque of the rotating gearing reaction element.

30. In a variable speed device, a power input member, hydrodynamic means including a vaned impeller coupled to said power input member, a vaned reaction member, a vaned auxiliary rotor and a turbine, a planetary gear set having a planet pinion carrier element coupled to said turbine and arranged to function as the driving member of said gear set, said pinion carrier element rotatably supporting planet pinions coactingly arranged to transmit the turbine torque to a sun gear element and a ring gear element of the planetary gear set in unequal ratioed portions, said sun gear element arranged to restrain the minor portion of the turbine torque and to function as a rotating gearing reaction element coactingly coupled to the vaned auxiliary rotor, said ring gear element arranged to impart the major portion of the turbine torque and to function as the output member of said gear set, said auxiliary rotor having vanes fashioned for fluidly restraining the torque of the rotating gearing reaction element and in further cooperative arrangement with the impeller vanes having fluid discharging end portions inclining backward to their direction of motion.

31. In a variable speed device, a power input member, hydrodynamic means including a vaned impeller coupled to said power input member, a vaned reaction member, a vaned auxiliary rotor and a turbine, a planetary gear set having a planet pinion carrier element coupled to said turbine and arranged to function as the driving member of said gear set, said pinion carrier element rotatably supporting planet pinions coactingly arranged to transmit the turbine torque to a sun gear element and a ring gear element of the planetary gear set in unequal ratioed portions, said sun gear element arranged to restrain the minor portion of the turbine torque and to function as a rotating gearing reaction element coactingly coupled to the vaned auxiliary rotor, said ring gear element arranged to impart the major portion of the turbine torque and to function as the output member of said gear set, said auxiliary rotor having vanes fashioned for fluidly restraining the torque of the rotating gearing reaction element and in further cooperative arrangement with the impeller vanes having fluid discharging end portions inclining forwardly to the direction of their motion.

32. In a variable speed device, a power input member, hydrodynamic means including a vaned impeller coupled to said power input member, a vaned reaction member, a vaned auxiliary rotor and a turbine, a planetary gear set having a planet pinion carrier element coupled to said turbine and arranged to function as the driving member of said gear set, said pinion carrier element rotatably supporting planet pinions coactingly arranged to transmit the turbine torque to a sun gear element and a ring gear element of the planetary set in unequal ratioed portions, said sun gear element arranged to restrain the minor portion of the turbine torque and to function as a rotating gearing reaction element coactingly coupled to the auxiliary rotor, said ring gear element arranged to impart the major portion of the turbine torque and to function as the output member of said gear set, said auxiliary rotor having vanes fashioned with their fluid entrance end portions inclining forwardly in cooperation with the fluid discharging end portions of the impeller vanes formed inclining backward to the direction of their motion.

References Cited in the file of this patent

UNITED STATES PATENTS

| | | |
|---|---|---|
| 2,196,660 | Dodge | Apr. 9, 1940 |
| 2,242,515 | Dodge | May 20, 1941 |
| 2,290,319 | Dodge | July 21, 1942 |
| 2,303,829 | Dodge | Dec. 1, 1942 |
| 2,334,394 | Dodge | Nov. 16, 1943 |
| 2,848,906 | Dodge | Aug. 26, 1958 |
| 2,890,600 | Smirl | June 16, 1959 |

FOREIGN PATENTS

| | | |
|---|---|---|
| 28,507 | Great Britain | Dec. 13, 1906 |

UNITED STATES PATENT OFFICE
CERTIFICATE OF CORRECTION

Patent No. 3,150,542                                September 29, 1964

Herbert K. Baker

It is hereby certified that error appears in the above numbered patent requiring correction and that the said Letters Patent should read as corrected below.

Column 2, line 57, after "fluid" insert -- clutching --; column 4, line 56, for "cross lined" read -- crossed line --; column 7, line 68, for "blades" read -- vanes --; column 10, line 24, for "action" read -- reaction --; column 16, line 40, strike out "clining forwardly to their direction of motion" and insert instead -- to the direction of their motion --.

Signed and sealed this 16th day of February 1965.

(SEAL)
Attest:

ERNEST W. SWIDER                                EDWARD J. BRENNER
Attesting Officer                                       Commissioner of Patents